US007718112B2

(12) United States Patent
Drew et al.

(10) Patent No.: US 7,718,112 B2
(45) Date of Patent: May 18, 2010

(54) NANOMETER SCALE STRUCTURES

(75) Inventors: Christopher Drew, Dracut, MA (US); Ferdinando Bruno, Andover, MA (US); Lynne Ann Samuelson, Marlboro, MA (US); Jayant Kumar, Westford, MA (US)

(73) Assignees: University of Massachusetts, Boston, MA (US); The United States of America as Represented by the Secretary of the Army, Washington, DC (US)

( * ) Notice: Subject to any disclaimer, the term of this patent is extended or adjusted under 35 U.S.C. 154(b) by 1287 days.

(21) Appl. No.: 11/209,898

(22) Filed: Aug. 23, 2005

(65) Prior Publication Data

US 2007/0284303 A1  Dec. 13, 2007

Related U.S. Application Data

(60) Provisional application No. 60/603,897, filed on Aug. 23, 2004.

(51) Int. Cl.
*B29C 47/00* (2006.01)
*B01D 71/00* (2006.01)

(52) U.S. Cl. .................. 264/465; 264/10; 264/441; 264/460; 210/500.27; 210/500.25; 428/402; 977/773

(58) Field of Classification Search .......... 264/48, 264/49, 41, 465, 10, 441, 460; 210/500.43, 210/500.27, 500.25; 977/773, 963, 737, 977/855, 740; 428/367, 402–404; 423/460, 423/445
See application file for complete search history.

(56) References Cited

U.S. PATENT DOCUMENTS

| | | | | |
|---|---|---|---|---|
| 4,584,103 A | * | 4/1986 | Linder et al. | 210/650 |
| 4,943,618 A | * | 7/1990 | Stoy et al. | 525/340 |
| 5,059,659 A | * | 10/1991 | Gregor et al. | 525/329.1 |
| 5,312,873 A | * | 5/1994 | Gregor et al. | 525/348 |
| 5,510,195 A | * | 4/1996 | Sano et al. | 428/613 |
| 5,811,192 A | | 9/1998 | Takahama et al. | |
| 5,843,567 A | * | 12/1998 | Swift et al. | 428/221 |
| 6,245,988 B1 | | 6/2001 | Grätzel et al. | |
| 7,247,375 B2 | * | 7/2007 | Song et al. | 428/403 |

OTHER PUBLICATIONS

Bognitzki et al., "Polymer, Metal, and Hybrid Nano- and Mesotubes by Coating of Degradable Polymer Template Fibers (TUFT Process)," *Adv. Mater.*, 12(9): 637-640 (2000).
Buchko et al., "Processing and Microstructural Characterization of Porous Biocompatible Protein Polymer Thin Films," *Polymer*, 40:7397-7407 (1999).

(Continued)

*Primary Examiner*—Ana M Fortuna
(74) *Attorney, Agent, or Firm*—Fish & Richardson P.C.

(57) ABSTRACT

Nanometer scale structures, and methods of making the same are disclosed.

30 Claims, 9 Drawing Sheets

OTHER PUBLICATIONS

Cahen et al, "Nature of Photovoltaic Action in Dye-Sensitized Solar Cells,"*J. Phys. Chem. B*, 104(9): 2053-2059 (2000).

Deki et al., "Titanium (IV) Oxide Thin Films Prepared from Aqueous Solution," *Chemistry Letters*, 6: 433-434 (1996).

Drew et al., "Electrostatic Assembly of Titanium Dioxide on Surface Functionalized Electrospun Nanofibers," *Polymer Preprints*, 44(2):111 (2003).

Drew et al., "Metal Oxide-Coated Polymer Nanofibers,"*Nano Letters*, 3(2): 143-147 (2003).

Fujishima and Honda, "Electrochemical Photolysis of Water as a Semiconductor Electrode," *Nature* 238: 37-38 (1972).

Gibson et al., "Transport Properties of Porous Membranes Based on Electrospun Nanofibers," *Colloids and Surfaces A: Physiochem. Eng. Aspects*, 87-188: 469-481 (2001).

Grätzel, "Mesoporous Oxide Junctions and Nanostructured Solar Cells,"*Current Opinion in Colloid and Interface Science*, 4: 314-321 (1999).

Grätzel, "Perspectives for Dye-sensitized Nanocrystalline Solar Cells," *Progress in Photovoltaics: Research and Applications*, 8: 171-185 (2000).

He et al., "Dye-sensitized Solar Cell Fabricated by Electrostatic Layer-by-Layer Assembly of Amphoteric $TiO_2$ Nanoparticles," *Langmuir*, 19(6): 2169-2174 (2003).

Hohman et al., "Electrospinning and Electrically Forced Jets. I. Stability Theory," *Physics of Fluids*, 13(8): 2201-2220 (2001).

Kishimoto et al, "Photocatalytic Activity of Titanium Oxide Prepared by Liquid Phase Deposition (LPD)," *J. Mater. Chem.*, 8(9): 2019-2024 (1998).

Kumar et al., "Enzymatically Synthesized Electronic and Photoactive Materials," *Chromogenic Phenomena in Polymers: Tunable Optical Properties, ACS Symposium Series*, 888 (29): 377-387 (2004).

Negishi and Takeuchi, "Preparation of Photocatalytic $TiO_2$ Transparent Thin Film by Thermal Decomposition of Ti-Alkoxide with α-Terpineol as a Solvent," *Thin Solid Films*, 392: 249-253 (2001).

O'Regan and Grätzel, "A Low-Cost, High-Efficiency Solar Cell Based On Dye-Sensitized Colloidal $TiO_2$ Films," *Nature*, 353: 737-740 (1991).

Reneker and Chun, "Nanometre Diameter Fibres of Polymer, Produced by Electrospinning," *Nanotechnology*, 7: 216-223 (1996).

Reneker et al., "Bending Instability of Electrically Charged Liquid Jets of Polymer Solutions in Electrospinning,"*J. Appl. Phys.*, 87(9): 4531-4547 (2000).

Shatalov et al., "The Effect of the Potential of Colloid Titanium Dioxide on Fluorescence Quenching," *Journal of Photochemistry and Photobiology A: Chemistry*, 94: 63-66 (1996).

Shimizu et al., "Low-Temperature Synthesis of Anatase Thin Films on Glass and Organic Substrates by Direct Deposition from Aqueous Solution," *Thin Solid Films*, 351: 220-224 (1999).

Shin et al., "Experimental Characterization of Electrospinning: the Electrically Forced Jet and Instabilities," *Polymer*, 42: 9955-9967 (2001).

Taylor, "Electrically Driven Jets," *Proc. Roy. Soc. Lond. A.*, 313(1515): 453-475 (1969).

Wang et al.,"A Highly Efficient Solar Cell Made from a Dye-Modified ZnO-Covered $TiO_2$ Nanoporous Electrode," *Chem. Mater.*, 13(2): 678-682 (2001).

Wang et al., "Biochemical Sensor via Combination of Electrospinning with Electrostatic Layer-by-Layer Assembly," *Polymeric Materials: Science & Engineering*, 88: 35-36 (2003).

Watanabe et al., "Photocatalytic Activity and Photoinduced Hydrophilicity of Titanium Dioxide Coated Glass," *Thin Solid Films*, 351: 260-263 (1999).

Yamaki et al., "Preparation of Epitaxial $TiO_2$ films by PLD for Photocatalyst Applications," *Journal of Crystal Growth*, 273-239: 574-579 (2002).

Zhu et al. "Development of a Gas Sensor Utilizing Chemiluminescence on Nanosized Titanium Dioxide," *Analytical Chemistry* 74(1): 120-124 (2002).

\* cited by examiner

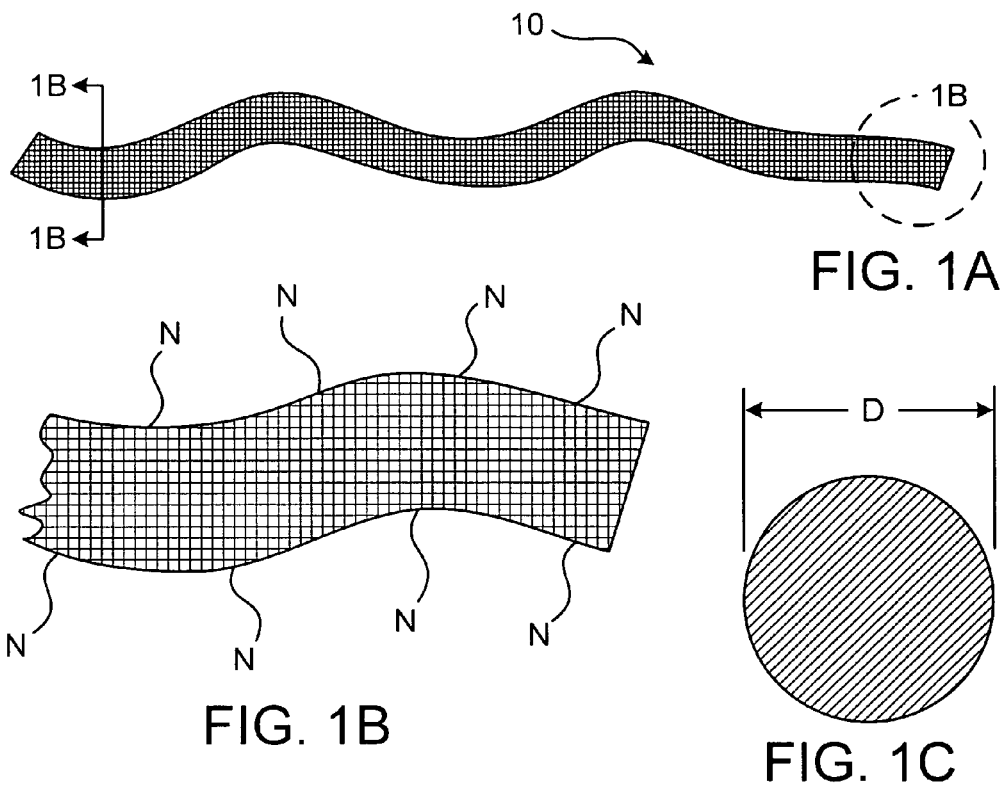
FIG. 1A
FIG. 1B
FIG. 1C
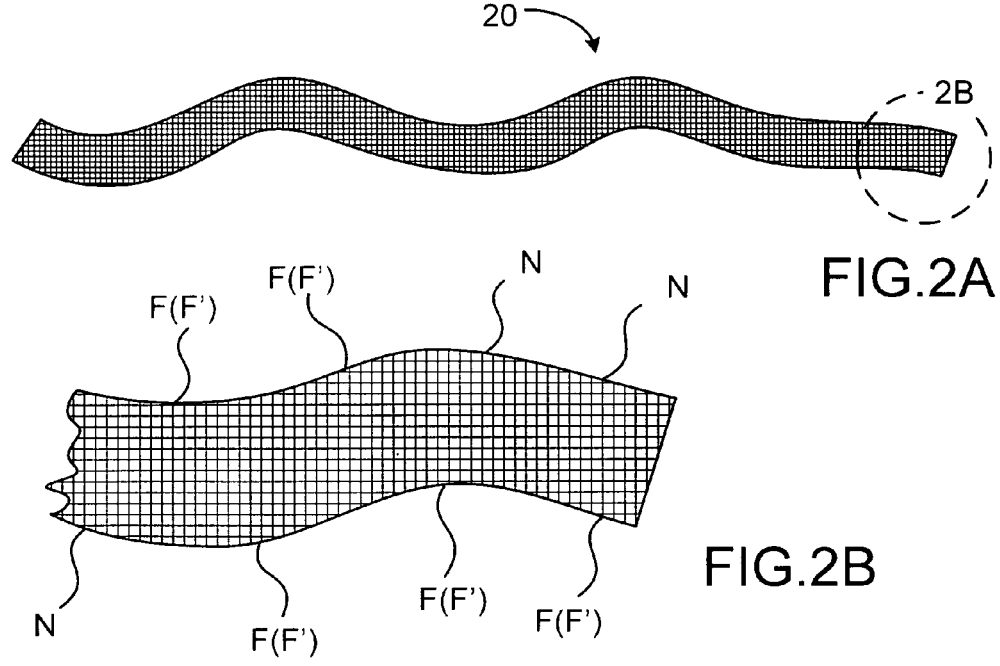
FIG. 2A
FIG. 2B

NANOMETER SCALE STRUCTURES

CROSS REFERENCE TO RELATED APPLICATIONS

This application claims priority from U.S. Provisional Patent Application No. 60/603,897, filed on Aug. 23, 2004, the contents of which is incorporated herein by reference in its entirety.

TECHNICAL FIELD

This invention relates to nanometer scale structures, and methods of making the same.

BACKGROUND

Bulk metal oxides, and metal oxide coatings are of interest due to their chemical and electrical properties. For example, tin oxide is a known electrical conductor that is optically transparent in the visible spectrum. Tin oxide is used in photovoltaic cells, liquid crystal displays, and light emitting diodes. Titanium dioxide is a wide band-gap semiconductor, and is also a good oxidizing agent for photo-excited molecules or functional groups. As such, titanium dioxide has been employed as a photocatalyst material, as a sensor material, and as an electrode material, e.g., in dye-based photovoltaic cells.

SUMMARY

In general, this invention relates to nanometer scale structures, e.g., functionalized fibers or particles, composite fibers or particles, e.g., metal oxide coated fibers or particles, fiber coatings, e.g., fibers or particles coated with polyelectrolytes, fibrous membranes, composite membranes, and methods of making the same. Such fibrous or particulate materials include fibers or particles that are nano-sized, e.g., that have a transverse dimension, e.g., a diameter, of less than 1000 nm.

Un-functionalized base fibers can be provided by spinning, e.g., electro-spinning, or melt spinning, e.g., extrusion melt spinning, e.g., co-extrusion melt spinning, or by phase separated synthesis.

Membranes can be provided, e.g., by electro-spinning, melt-blowing, or by phase separated synthesis.

Functionalized fibers are provided that include a first functional group, e.g., a nitrile group, that can be converted to a second functional group, e.g., an acid or a carboxylate group. The second functional group can react with a reactive metal intermediate, e.g., a metal hydroxide, e.g., generated in-situ from reaction of a metal halide, e.g., a metal fluoride with water in the presence of a halide scavenger, e.g., a fluoride scavenger. The reactive metal intermediate can be in a solvent, e.g., water, or can be in the gas phase, e.g., with a diluent, e.g., argon. Surprisingly, such functionalized fibers keep many of the advantageous mechanical and morphological properties of the base fibers from which they are derived. Thus, the base fibers are not significantly impaired or degraded by the functionalization methods described herein.

Composite fibers can be made, e.g., by contacting functionalized fibers with a reactive metal intermediate, e.g., a metal hydroxide, under conditions and for a time sufficient to deposit a metal oxide coating on the functionalized fiber. Metal oxides include, for example, titanium oxide, zinc oxide, tin oxide, silicon oxide, iron oxide, lead oxide, aluminum oxide, hafnium oxide, or mixed metal oxides. Surprisingly flexible, yet durable metal oxide coated fibers can be produced. In some embodiments, the functionalized fibers can be bent and flexed without substantially disrupting the coating.

Coated fibers can be made, e.g., by contacting a charged functionalized fiber, e.g., a negatively or positively charged fiber, with a polyelectrolyte solution having an opposite charge to that of the charged fiber. Many layers, e.g., two, three, five, ten, twenty, or more, e.g., fifty, can be built up. Optionally, one or more metal oxide coatings can be deposited as an intermediate layer or layers, or as an outer layer or layers.

Functionalized membranes also are provided that include fibers that include a first functional group, e.g., a nitrile group, that can be converted to a second functional group, e.g., an acid or a carboxylate group. The second functional group can react with a reactive metal intermediate, e.g., a metal hydroxide, e.g., generated in-situ from reaction of a metal halide, e.g., a metal fluoride with water in the presence of a halide scavenger, e.g., a fluoride scavenger. The reactive metal intermediate can be in a solvent, e.g., water, or can be in the gas phase, e.g., with a diluent, e.g., argon. Surprisingly, such functionalized membranes keep many of the advantageous mechanical and morphological properties of the base membranes from which they are derived.

In other embodiments, the invention includes composite membranes that are made by contacting functionalized membranes with a reactive metal intermediate, e.g., a metal hydroxide, under conditions and for a time sufficient to deposit a metal oxide coating on the functionalized membrane. Surprisingly flexible and durable metal oxide coated membranes can be obtained. The reactive metal intermediate can be in a solvent, e.g., water, or can be in the gas phase, e.g., with a diluent, e.g., argon.

Un-functionalized nanoparticles can be made by phase separated chemical synthesis, e.g., polymerization using surfactants and/or immiscible solvents. Nanoparticles can be spherical in shape, or non-spherical in shape, e.g., oblong, in shape.

Functionalized nanoparticles are provided that include a first functional group, e.g., a nitrile group, that can be converted to a second functional group, e.g., an acid or a carboxylate group. The second functional group can react with a reactive metal intermediate, e.g., a metal hydroxide, e.g., generated in-situ from reaction of a metal halide, e.g., a metal fluoride with water in the presence of a halide scavenger, e.g., a fluoride scavenger. The reactive metal intermediate can be in a solvent, e.g., water, or can be in the gas phase, e.g., with a diluent, e.g., argon. Functionalized particles keep many of the advantageous mechanical properties of the base particles from which they are derived.

Composite nanoparticles are provided, by contacting functionalized nanoparticles with a reactive metal intermediate, e.g., a metal hydroxide, under conditions and for a time sufficient to deposit a metal oxide coating on the functionalized nanoparticles. Metal oxides include, for example, titanium oxide, zinc oxide, tin oxide, silicon oxide, iron oxide, lead oxide, aluminum oxide, hafnium oxide, or mixed metal oxides. Metal oxide coatings can be, e.g., from about 2 to about 50 nm thick, e.g., from about 2 to about 25 nm thick, or from about 3 to about 15 nm thick. Compressible, yet durable metal oxide coated nanoparticles can be provided.

Coated nanoparticles are provided, e.g., by contacting charged functionalized nanoparticles, e.g., negatively or positively charged nanoparticles, with a polyelectrolyte solution having an opposite charge to that of the charged nanoparticles. Many layers, e.g., two, three, five, ten, or twenty, can be built up. Optionally, a metal oxide coating can be deposited as the outer-most layer.

An "ionizable hydrogen atom" is one that has a pKa, or an expected pKa, of between about 1.5 and 35 when measured in dimethyl sulfoxide (DMSO). See Bordwell et al., *Accts. Chem. Research* 21, 456 (1988). Examples of functional groups that include an ionizable hydrogen atom are, e.g., hydroxyl groups, sulfhydryl groups, organic acid groups, amide groups, acids of phosphorus, and amine groups.

In one aspect, the invention features a method of making a functionalized nanostructure that includes providing a nanostructure including a substantially water-insoluble polymer that includes neutral functional groups without ionizable hydrogen atoms on its surface. The nanostructure has a transverse dimension less than 1000 nm. At least some of the neutral functional groups are reacted with a reagent under conditions and for a time sufficient so as to convert at least some of the neutral functional groups to converted functional groups. The converted functional groups include one or more anions, ionizable hydrogen atoms, or a mixture of anions and ionizable hydrogen atoms.

The nanostructure can be, e.g., in the form of a fiber or a particle. In some embodiments, the fiber is part of a fibrous network, e.g., a fibrous membrane.

The reagent can be, e.g., in a liquid phase. Conditions can include, e.g., heating in a liquid phase at a temperature of less than 100° C. for less than 1 hour.

The neutral functional groups without ionizable hydrogen atoms can be, e.g., nitrile groups, anhydride groups, acetate groups, ester groups, peroxide groups, azo groups, vinyl groups, or mixtures of these groups.

The anion can be, e.g., a carboxylate, a phosphate, the conjugate base of a sulfonic acid, the conjugate base of a sulfhydryl group, the conjugate base of a hydroxyl group, or mixtures these groups.

The functional groups including an ionizable hydrogen atom can be, e.g., an acyclic amide group, a cyclic amide group, an amino group, a hydroxyl group, a sulfhydryl group, a carboxylic acid group, or mixtures of these groups.

The polymer can be, e.g., polyacrylonitrile, polymethacrylonitrile, poly(acrylonitrile-co-methacrylonitrile), poly(acrylonitrile-co-butadiene), poly(methacrylonitrile-co-butadiene), poly(acrylonitrile-co-butadiene-co-acrylic acid), poly(acrylonitile-co-butadiene-co-styrene), poly(acrylonitrile-co-methyl acrylate), poly(acrylonitrile-co-vinylidene chloride-co-methyl methacrylate), polyvinylazobenzene, poly(vinyl acetate), poly(methyl acrylate), poly(methyl methacrylate), poly(allylamine), or mixtures of these polymers.

The reagent can include a Bronsted base, e.g., a solution of sodium hydroxide, or a Bronsted acid, e.g., hydrochloric acid in water.

In some embodiments, a surface of the functionalized fiber includes from about $1.5 \times 10^{15}$ to about $1.5 \times 10^{30}$ total converted groups per gram of nanostructure.

In some embodiments, the transverse dimension is less than about 500 nm, e.g., less than 250 nm, or less than 100 nm.

The method further include, e.g., contacting the functionalized nanostructure with a metal hydroxide under conditions and for a time sufficient to deposit a metal oxide coating onto the functionalized nanostructure, or contacting the functionalized nanostructure with another polymeric material for a time sufficient to deposit a coating of the other polymeric material onto the functionalized nanostructure.

In another aspect, the invention features methods of making a functionalized membrane that includes providing a membrane comprising fibers including a water-insoluble polymer that includes neutral functional groups without ionizable hydrogen atoms on its surface. The fibers have a diameter of less than 1000 nm. At least some of the neutral functional groups are reacted with a reagent under conditions and for a time sufficient so as to convert at least some of the neutral functional groups to converted functional groups. The converted functional groups include one or more anions, ionizable hydrogen atoms, or a mixture of anions and ionizable hydrogen atoms.

The method can further include, e.g., contacting the functionalized membrane with a metal hydroxide under conditions and for a time sufficient to deposit a metal oxide coating onto fibers of the functionalized membrane.

In another aspect, the invention features membranes that include overlapping fibers including a water-insoluble polymer that includes functional groups including an anion, an ionizable hydrogen atom, or a mixture of an anion and an ionizable hydrogen atom on its surface. The fiber has a dimension less than 1000 nm. The polymer is selected from polyacrylonitrile, polymethacrylonitrile, poly(acrylonitrile-co-methacrylonitrile), poly(acrylonitrile-co-butadiene), poly(methacrylonitrile-co-butadiene), poly(acrylonitrile-co-butadiene-co-acrylic acid), poly(acrylonitrile-co-butadiene-co-styrene), poly(acrylonitrile-co-methyl acrylate), poly(acrylonitrile-co-vinylidene chloride-co-methyl methacrylate), polyvinylazobenzene, poly(vinyl acetate), poly(methyl acrylate), poly(methyl methacrylate), poly(allylamine), or mixtures of these.

In some embodiments, the fibers have between about $1.5 \times 10^{15}$ to about $1.5 \times 10^{30}$ total functional groups per gram of fiber.

The membrane may further include a metal oxide disposed on the surface of at least some of the fibers.

In some embodiments, the overlapping fibers are also bonded together.

The membrane can be, e.g., fashioned into an electrode, a catalyst, e.g., a photo catalyst, or a sensor.

In another aspect, the invention features nanostructures that include a substrate including a water-insoluble polymer that includes functional groups including an anion, an ionizable hydrogen atom, or a mixture of an anion and an ionizable hydrogen atom on its surface. The substrate has a transverse dimension less than 1000 nm. The polymer has a moisture absorption of less than five weight percent at room temperature.

In some embodiments, the polymer includes polyacrylonitrile, polymethacrylonitrile, poly(acrylonitrile-co-methacrylonitrile), poly(acrylonitrile-co-butadiene), poly(methacrylonitrile-co-butadiene), poly(acrylonitrile-co-butadiene-co-acrylic acid), poly(acrylonitile-co-butadiene-co-styrene), poly(acrylonitrile-co-methyl acrylate), poly(acrylonitrile-co-vinylidene chloride-co-methyl methacrylate), polyvinylazobenzene, poly(vinyl acetate), poly(methyl acrylate), poly(methyl methacrylate), poly(allylamine), and mixtures of these polymers.

Embodiments may have one or more of the following advantages. Metal oxide coated nanostructures having high electrical conductivity can be prepared without applying a high temperature sintering step. Surprisingly flexible and/or compressible, and durable metal oxide coated fibers, and durable metal oxide coated particles are provided. Deposition of metal oxide onto functionalized nanostructures can occur at a fast deposition rate, e.g., a deposition rate that is two, three, or even ten times faster that the deposition rate onto un-functionalized structures, e.g., particles or fibers. Functionalized nanostructures, e.g., fibers or particles, can be produced without significant loss of mechanical or morphological properties. Thinner, contiguous coatings of metal oxides on nanostructures offer advantageous electron transport, and separation properties due to quantum effects.

Deposition techniques can be used to include other materials, e.g., dopants, into a coating. For example, fluorine can be incorporated into a tin oxide coating, which changes the electrical conductivity of the coating from an insulator to a good conductor. Other dopants can change the electronic band structure of the metal oxide, which can be employed when the metal oxide oxidizes a molecule, e.g., titanium dioxide used to oxide a photo-excited molecule. The conducting band edge of the metal oxide can be adjusted to match the excited energy level of the oxidized molecule. Novel, high surface-area membranes can be provided for improved sensing, catalysis, and electronic applications. Achievable surface areas of such membranes can be from about 20 square meters per gram to about 500 square meters per gram, e.g., 25, 50, 75, 100, or 250 square meters per gram.

Surprisingly, the nanostructures can be surface-modified by the methods described herein without destroying the mechanical properties of the underlying base structure.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

FIG. 1A is a schematic representation of a fiber prior to functionalization.

FIG. 1B is a highly enlarged schematic representation of a portion of the fiber shown in FIG. 1A.

FIG. 1C is a transverse cross-section of the fiber shown in FIG. 1A.

FIG. 2A is a schematic representation of the fiber shown in FIG. 1A after functionalization.

FIG. 2B is a highly enlarged schematic representation of a portion of the fiber shown in FIG. 2A.

Like reference symbols in the various drawings indicate like elements.

DETAILED DESCRIPTION

Figure 3:
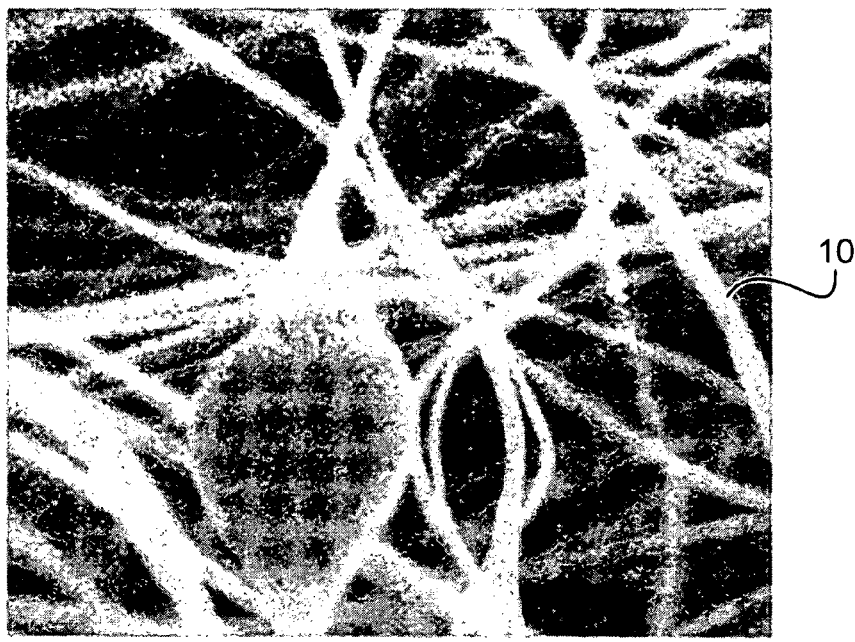
FIGS. 3 and 4 are scanning electron micrographs of different regions of a fibrous membrane before functionalization and after functionalization, respectively.

In general, this invention relates to nanometer scale structures, e.g., functionalized fibers or particles, composite fibers or particles, e.g., metal oxide coated fibers or particles, fiber coatings, e.g., fibers or particles coated with polyelectrolytes, fibrous membranes, composite membranes, and methods of making the same. Generally, each nanometer scale structure has a transverse dimension of less than 1000 nm, and has a surface that includes neutral functional groups, e.g., nitrile groups. The transverse dimension of a nanostructure is its diameter if it is a spherical particle or a relatively long thin fiber, or a maximum size of an irregularly shaped particle.

Fibers

Referring to FIGS. 1A and 1B, a water-insoluble, un-functionalized fiber 10 formed from polymeric material includes neutral functional groups (N) without ionizable hydrogen atoms on its surface. Referring to FIG. 1C, fiber 10 is selected to have a diameter D of than 1000 nm, e.g., less than about 750 nm, 500 nm, 250 nm, 200 nm, 150 nm, 125 nm, 100 nm, 75 nm, 50 nm, or less than about 30 nm. Referring now to FIGS. 2A and 2B, a functionalized fiber 20 is produced, e.g., by reacting a percentage, e.g., from about 5 percent to about 100 percent, from about 10 percent to about 80 percent, from about 25 percent to about 70 percent, of the available neutral functional groups (N) with a reagent under conditions, e.g., less than 100° C., and for a time sufficient, e.g., less than 120 minutes at a reagent concentration of 1 M in water (e.g., from 5 minutes to 80 minutes, 10 minutes to 60 minutes, 15 minutes to 45 minutes, or 15 minutes to 30 minutes) to convert some of the neutral functional groups (N) to functional groups comprising an anion (F), e.g., a carboxylate group, and/or functional groups comprising an ionizable hydrogen atom (F'), e.g., a carboxylic acid group. In some embodiments, the reagent is in a liquid phase, e.g., NaOH dissolved in water. In some implementations, the reagent is in a gas phase. Neutral functional groups without ionizable hydrogen atoms can be, e.g., nitrile groups, anhydride groups, acetate groups, ester groups, e.g., ester groups of a poly(alkyl acrylate), peroxide groups, azo groups, vinyl groups, or mixtures of these groups.

The anions can be carboxylates, phosphates, the conjugate bases of sulfonic acids, the conjugate bases of sulfhydryl groups, the conjugate bases of a hydroxyl groups, e.g., an alkyl hydroxyl group or an aromatic hydroxyl group, or mixtures of these groups.

The functional groups that include an ionizable hydrogen atom can be, e.g., acyclic amide groups, cyclic amide groups, amino groups, hydroxyl groups, sulfhydryl groups, carboxylic acid groups, siloxane groups, or mixtures of these groups.

In some embodiments, the ionizible hydrogen atom, e.g., water ionizable hydrogen atom, has a pKa of from about 1.5 to about 35, e.g., from about 5 to about 25, or from about 5 to about 19, measured in DMSO. In some implementations, the hydrogen atom is covalently bound to an atom other than a carbon atom or an oxygen atom, e.g., a nitrogen atom or sulfur atom.

The polymeric material can be, e.g., polyacrylonitrile, polymethacrylonitrile, poly(acrylonitrile-co-methacrylonitrile), poly(acrylonitrile-co-butadiene), poly(methacrylonitrile-co-butadiene), poly(acrylonitrile-co-butadiene-co-acrylic acid), poly(acrylonitile-co-butadiene-co-styrene), poly(acrylonitrile-co-methyl acrylate), poly(acrylonitrile-co-vinylidene chloride-co-methyl methacrylate), or mixtures of these polymers. Other suitable polymers are, e.g., polyvinylazobenzene, poly(vinyl acetate), poly(methyl acrylate), poly(methyl methacrylate), poly(allylamine), or mixtures of these polymers.

In some embodiments, the polymeric material absorbs less than 5 weight percent water when immersed at room temperature in pure water, e.g., less than 4 percent, 3 percent, less than 2 percent, 1 percent, 0.5 percent, or even less than 0.1 percent.

In some embodiments, the reagent can include a Bronsted base. In specific embodiments, the Bronsted base is an aqueous solution of sodium hydroxide, e.g., at a concentration of 1 M.

In some implementations, the conversion of groups N to groups F or F' occurs at a temperature of less than 100° C., e.g., less than 90° C., 80° C., 75° C., 50° C., 4° C., or even less than 25° C. In specific implementations, conversion is allowed to proceed for less than 3 hours, e.g., less than 1 hour, 45 minutes, 30 minutes, or less than 20 minutes.

In some embodiments, a concentration of the reagent is less than 5 M, e.g., less than 3 M, 2 M, 1 M, 0.5 M or even less than 0.25 M. In some embodiments, the concentration of the reagent is form about 0.1 M to about 1 M, 0.5 M to about 1 M or from 0.5 M to about 3 M.

In some embodiments, the reagent includes a Bronsted acid, e.g., an aqueous solution of hydrochloric acid. In specific embodiments, the hydrochloric acid is at a concentration of about 1 M.

To facilitate the deposition of coatings, e.g., metal oxide coatings, a surface of the functionalized fiber includes from about $1.5 \times 10^{15}$ to about $1.5 \times 10^{30}$ total functional groups per gram of fiber, e.g., from about $1.5 \times 10^{16}$ to about $1.5 \times 10^{25}$ or from about $1.5 \times 10^{17}$ to about $1.5 \times 10^{23}$. The total number of functional groups is the total number of functional groups including an anion (F) plus the total number of functional groups including an ionizable hydrogen atom (F'). In some cases, all functional groups will be anionic, while in other situations, the surface of the functionalized fiber will have mixtures of the two types of functional groups. The number of functional groups can be measured potentiometrically or by titration. For example, when acid groups are present, the number of such acid groups can be determined by titration with a base. Suitable titration machines are available from Mettler-Toledo, or Spectralab.

Surprisingly, we have found that such functionalized fibers keep many of the advantageous mechanical and morphological properties of the base fibers from which they are derived. Without wishing to be bound by any particular theory, it is believed that providing an insoluble fiber, e.g., insoluble in water, or, in some embodiments, a fiber not even swollen by a solvent, e.g., water, prevents the reagent, e.g., NaOH, from substantially penetrating the fiber, thereby only converting the neutral functional groups at the surface of the fiber, and not the neutral functional groups within the fiber. Deep penetration within fibers can result in fibers having lower mechanical properties, e.g., lower elongation at break, lower tensile modulus and lower impact strength.

In some implementations, the un-functionalized fiber 10 is provided by electro-spinning. In specific embodiments, the fiber is oriented.

Fibrous Membranes

Figure 4:
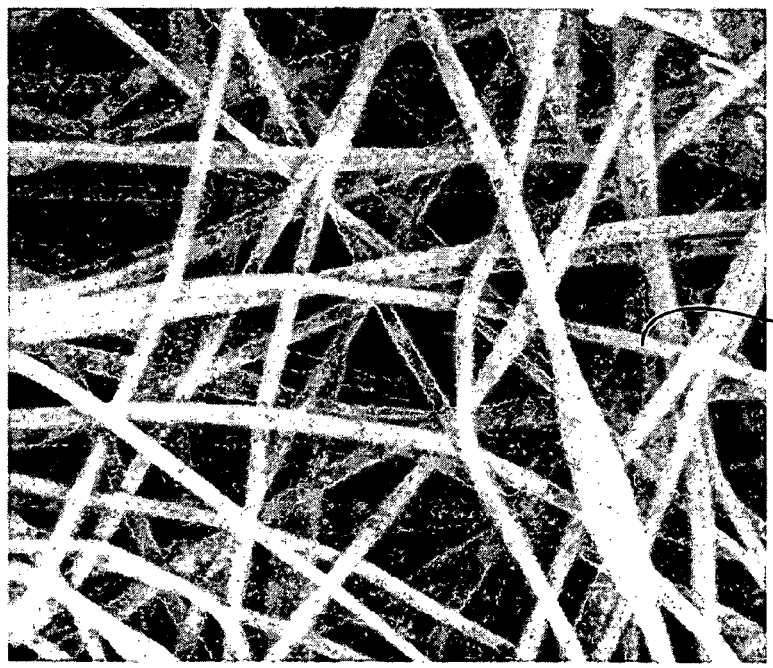

Referring to FIG. 3, an un-functionalized membrane 120 includes randomly oriented fibers 10 that are piled on top of one another and bonded together. Referring to FIG. 4, un-functionalized membrane can be functionalized by the methods discussed herein, generating a functionalized membrane 130 that includes fibers 20 that include functional groups comprising an anion (F), and/or functional groups comprising an ionizable hydrogen atom (F').

In some embodiments, membranes 120 and 130 have a surface area of from about 10 square meters per gram to about 500 square meters per gram, e.g., from about 10 to about 350 square meters per gram, or from about 25 square meters per gram to about 250 square meters per gram, or from about 25 square meters per gram to about 100 square meters per gram. In specific implementations, membranes 120 and 130 have a surface area of about 15 square meters per gram to about 80 square meters per gram.

Figure 5:
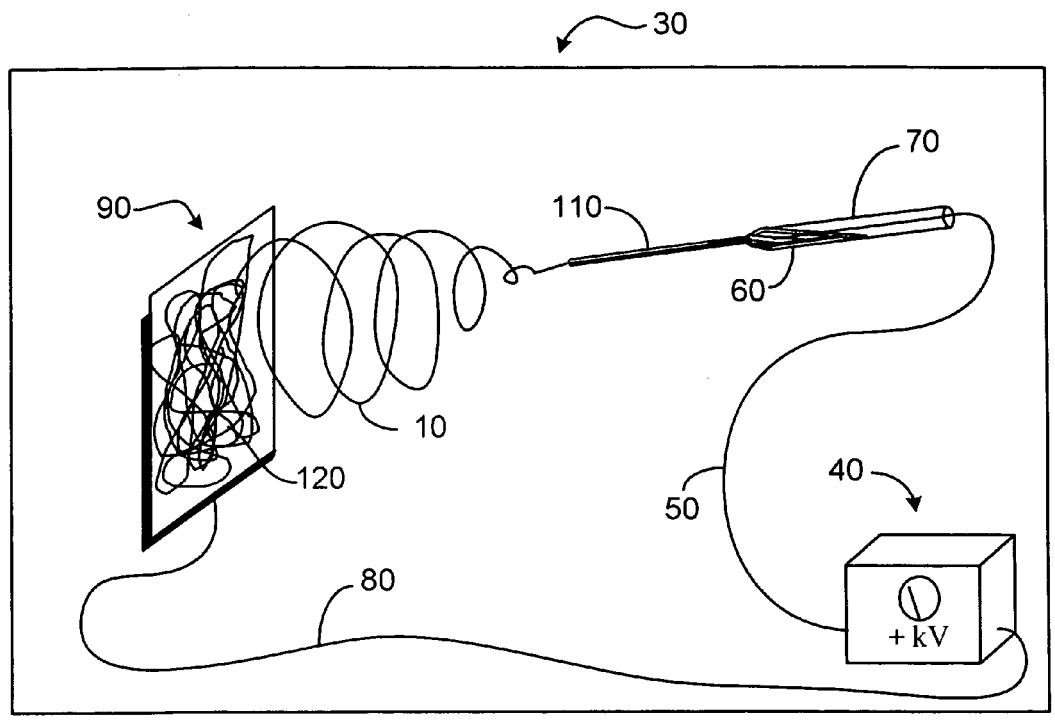
FIG. 5 is a schematic representation of an electro-spinning process.

Such membranes 120 can be made by various known methods, including for example, electro-spinning. For example, FIG. 5 shows an electro-spinning apparatus 30 that includes a DC power source 40 that is connected to an electrode 50 in the form of a wire. To make the membrane, electrode 50 is immersed in a viscous polymer solution 60, e.g., polyacrylonitrile dissolved in N,N-dimethyl formamide (DMF), that is held in a container 70, e.g., a glass pipette. A ground wire 80 originating from power source 40 is attached to a conducting target 90, e.g., made of aluminum, copper, platinum, gold, or stainless steel. During operation, a potential difference, e.g., from about 15 to 50 kV, is applied to the system, which drives fibers 10 from tip 110 toward target 90. Electro-spun fibers are collected on target 90 as a membrane 120 of randomly oriented fibers. The fibers can be long, e.g., 10 cm to even over 1 m, e.g., 2 m, 10 m, 100 m or even 1000 m. Short fibers that are less than 10 cm, e.g., 5 cm, 1 cm, 0.5 cm, 0.1 cm or even less than 0.01 cm can also be made, e.g., by oscillating the power source on and off.

In embodiments in which polyacrylonitrile (PAN) fibers are spun, spin dopes are made with PAN having a number average molecular weight of about 15,000 D to about 1,000,000 D, e.g., from about 75,000 D to about 150,000 D. In a specific implementation, a spin dope is about eight weight percent PAN in DMF, and the PAN has a number average molecular weight of about 86,200 D.

In some implementations, the distance from tip 110 to target 90 is from about 5 to about 50 cm, e.g., from about 7.5 to about 25 cm, or from about 10 to about 20 cm. In a specific implementation, the distance from tip 110 to target 90 is about 15 cm. The distance prevents arcing, and in some embodiments, provides more in-flight time for the solvent to evaporate, when this is desirable.

Figure 6:
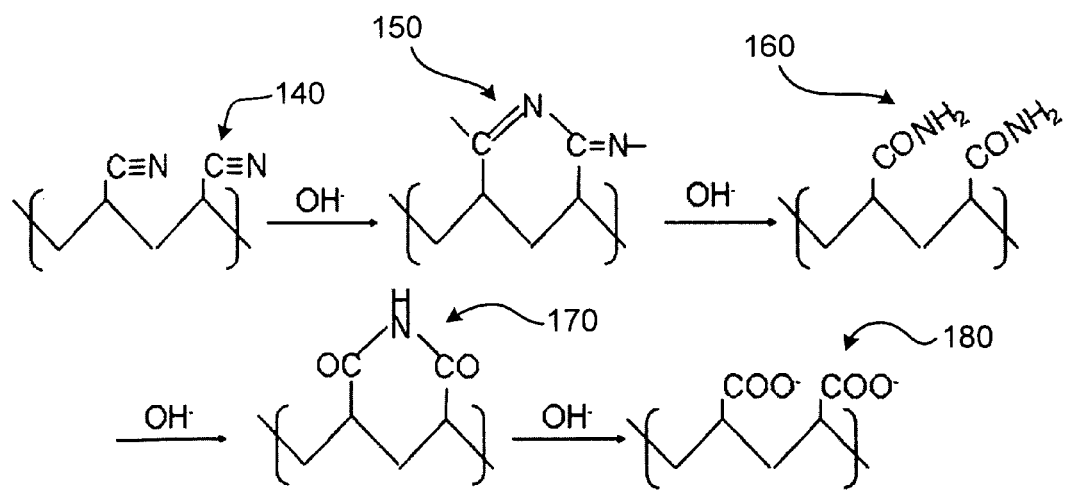
FIG. 6 is a reaction scheme for functionalization of polyacrylonitrile.
Figure 7:
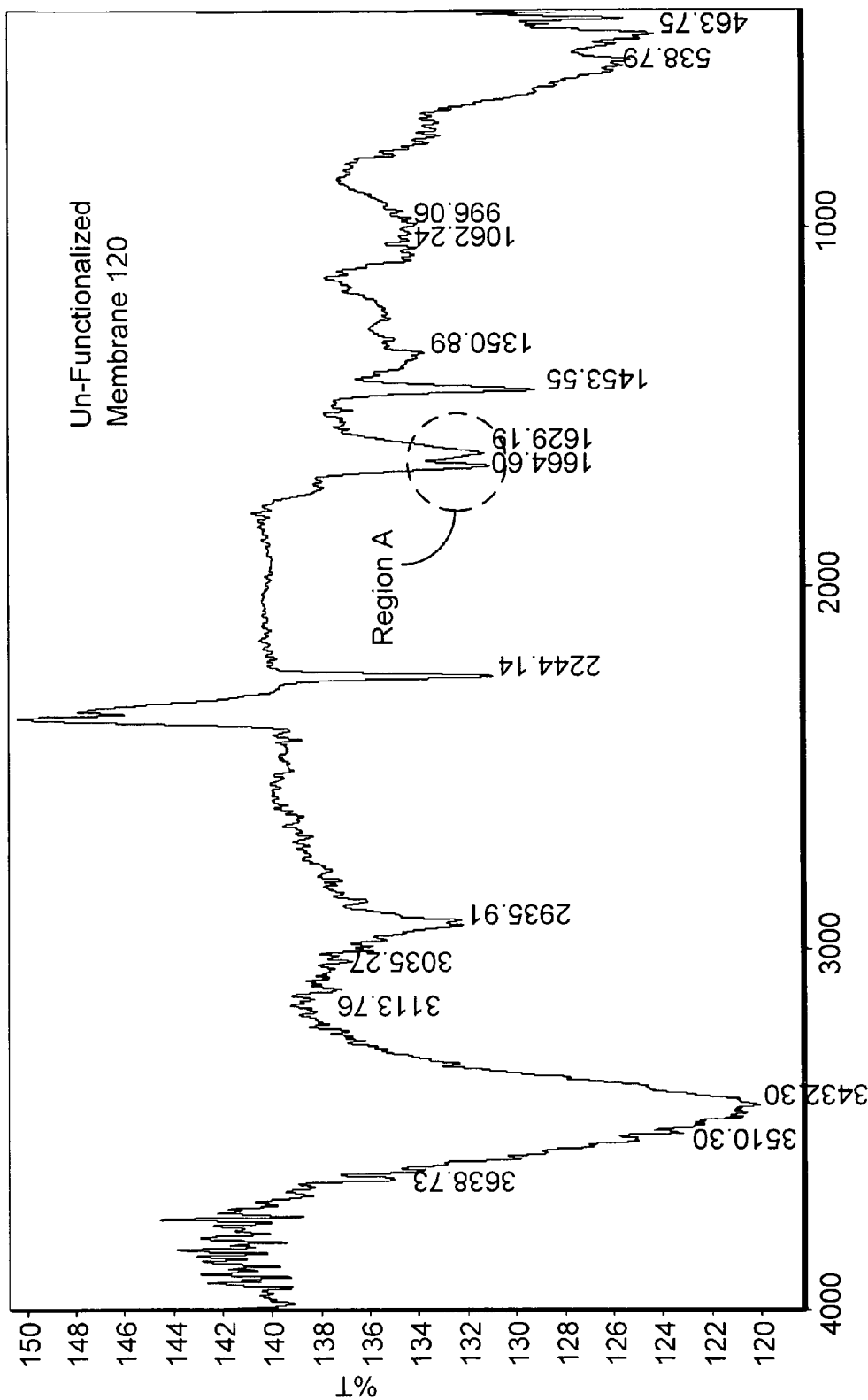
FIGS. 7 and 8 are infrared spectra of a fibrous polyacrylonitrile membrane before functionalization and after functionalization, respectively
Figure 8:
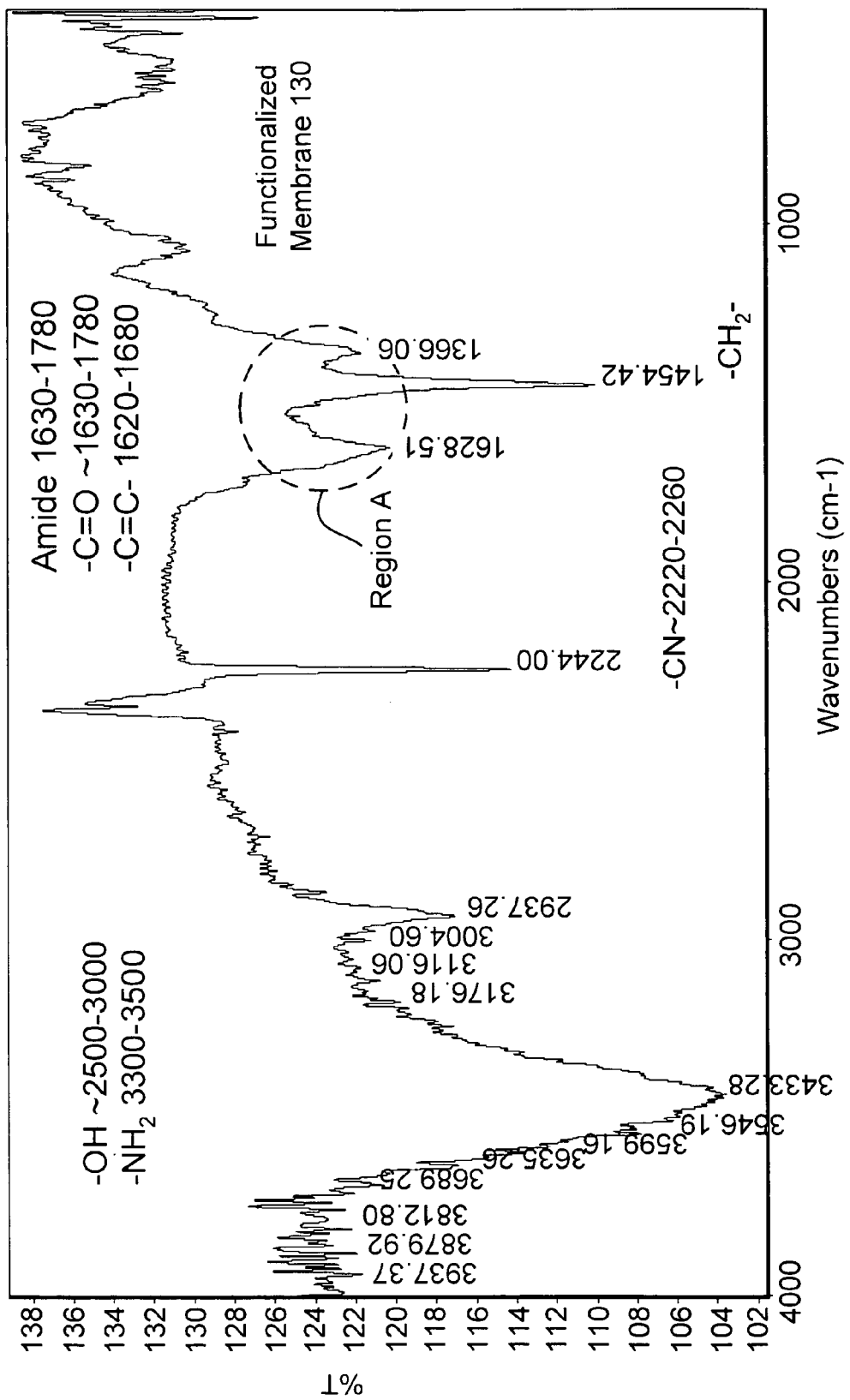

FIG. 6 schematically illustrates hydrolysis of PAN membrane surfaces. In particular, hydrolysis of surface nitrile groups 140 of PAN 142 with NaOH produces a variety of species, including cyclic imino moieties 150, acyclic amide moieties 160, cyclic amide moieties 170, and moieties that include carboxylate groups 180. The result that hydrolysis produces a variety of species is supported by referring to FIGS. 7 and 8, which are IR spectra of an unfunctionalized membrane 120 and a functionalized membrane 130, respectively. Referring particularly to Region A of FIG. 8, after functionalization, the IR spectrum shows the likely presence of C=O bonds, C=C bonds, and amide bonds. In addition, FIG. 8 shows that nitrile groups are still present in the functionalized fiber. This result indicates that functionalization takes place primarily on the surface, which is advantageous because full functionalization, i.e., full hydrolysis of all nitrile groups to carboxylate groups would produce a soluble fiber, which would not enable additional functionalization, e.g., coating with a metal oxide as will be discussed below.

Surprisingly, such functionalized membranes 130 keep many of the advantageous mechanical and morphological properties of the base membranes 120 from which they are derived. Without wishing to be bound by any particular theory, it is believed that providing a membrane 120 with insoluble fibers 10 prevents a reagent, e.g., NaOH, from substantially penetrating into fibers of the membrane, functionalizing only the surface of the fiber, and therefore, not destroying the internal regions of the fibers which can degrade mechanical properties.

Liquid Phase Deposition of Metal Oxides onto Functionalized Fibers and Membranes Functionalized membranes can be provided that include fibers that include a first functional group, e.g., a nitrile group, that can be converted to a second functional group, e.g., an acid or a carboxylate group. The second functional group can react with a reactive metal intermediate, e.g., a metal hydroxide, e.g., generated in-situ from reaction of a metal halide, e.g., a metal fluoride, with water in the presence of a halide scavenger, e.g., a fluoride scavenger.

A reaction scheme is shown below that illustrates that a metal fluoride (A) can be hydrolyzed to produce a metal hydroxide (B), releasing hydrofluoric acid, fluoride ions. This reaction can be driven by fluorine consumption with a fluorine scavenger, e.g., boric acid (C). In this particular example, fluorine consumption is driven by the formation of a strong B—F bond. Condensation can occur by linking together metal hydroxides (B) that are formed, producing a small molecule metal hydroxy-oxide (D). Further condensation can occur to produce a metal oxide, e.g., a titanium dioxide. If a nucleating surface is present, e.g., in the form of a fiber or fibers constructed into a membrane, metal oxide coatings can be grown on these surfaces.

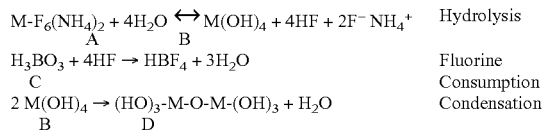

The above reaction scheme is general, and can be used with many different reactive metal compounds, e.g., a metal halide, e.g., a metal chloride or a metal fluoride, e.g., $SnF_6(NH_4)_2$, $ZnF_2$, $TiF_6(NH_4)_2$, $SiF_6(NH_4)_2$, or mixtures of these metal fluorides.

If a mixture of reactive metal compounds are used, mixed metal oxides result, e.g., a coating that includes both titanium dioxide and tin oxide.

Figure 9:
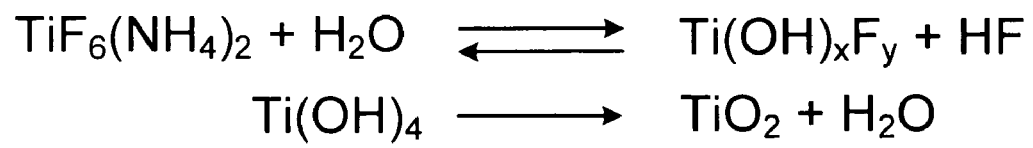
FIG. 9 is a reaction scheme for producing titanium hydroxide from titanium hexafluoride diammonium.
Figure 10:
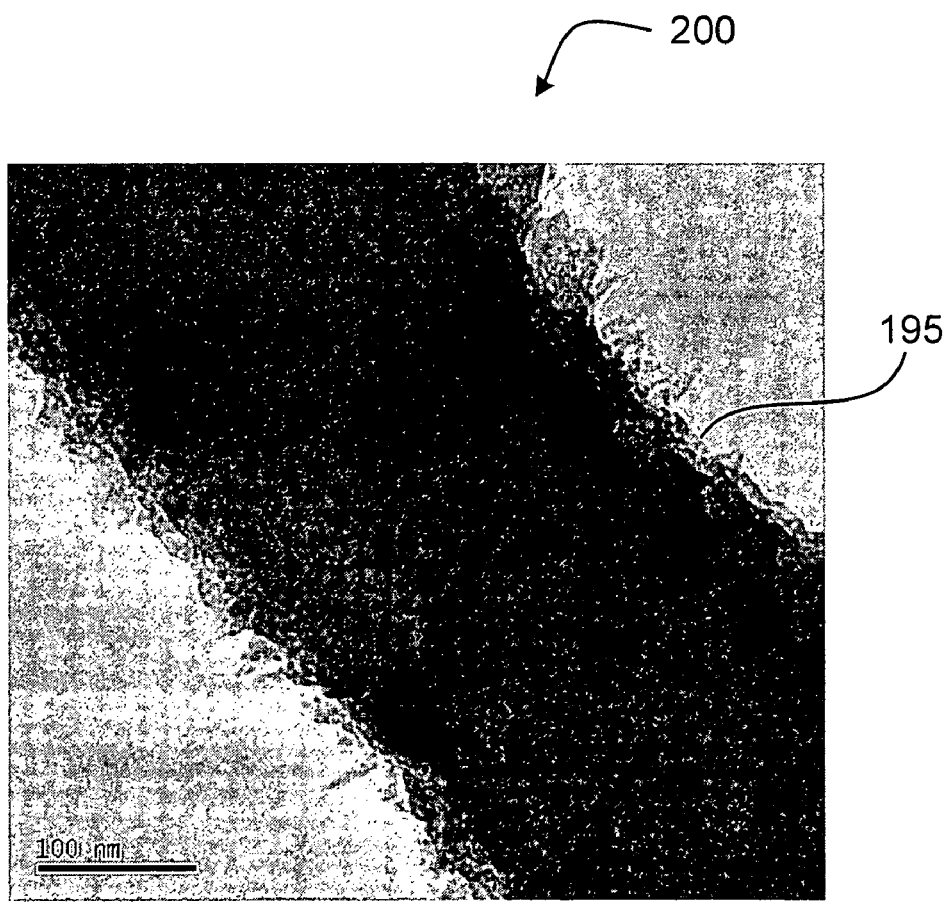
FIG. 10 is a scanning electron micrograph of a functionalized fiber coated with titanium dioxide.

In a particular embodiment, titanium dioxide coatings can be grown on fibers using $TiF_6(NH_4)_2$. As shown in FIGS. 9 and 10, composite fibers can be made by providing fibers that include a water-insoluble polymer that includes neutral functional groups without ionizable hydrogen atoms on its surface (like that of FIGS. 1A and 1B). Some of the neutral functional groups are reacted with a reagent under conditions and for a time sufficient to convert some, e.g., from about 5 percent to about 100 percent, from about 10 percent to about 80 percent, from about 25 percent to about 70 percent, of the neutral functional groups to functional groups having an anion and/or an ionizable hydrogen atom, thereby generating a functionalized fiber (like that of FIGS. 2A and 2B). The functionalized fiber is contacted with a metal hydroxide under conditions, e.g., less than 1 M metal concentration and less than 50° C., and for a time sufficient, e.g., less than 24 hours, to deposit a metal oxide coating 195 on the functionalized fiber, generating a composite fiber 200. Coating times can be, e.g., less than 24 hours, e.g., less than 18 hours, 15 hours, 10 hours, 9 hours, 8 hours, 6 hours, 4 hours, or even less than 1 hour, at a metal concentration of less than 5 M or 1 M, and solution temperature of less than less than 50° C., e.g., less than 25° C.

If this same sequence is applied using a fibrous membrane, a composite membrane is produced.

Referring back to FIG. 6, when the particular embodiment uses PAN fibers, it is believed that the acyclic amide moieties 160, the cyclic amide moieties 170, and the carboxylate groups react with the metal hydroxide (e.g., $Ti(OH)_4$), producing many nucleation sites for a metal oxide coating to grow. This allows deposition of the metal oxide to occur on the functionalized fibers at a surprisingly fast deposition rate, e.g., a deposition rate that is two, three, or even ten times faster than the deposition rate onto an un-functionalized fiber, e.g., less than 24 hours, less than 12 hours, 10 hours, 5 hours, 4 hours, or even less than 2 hours. In addition, surprisingly, the nano-sized functionalized fibers, and thus any membranes constructed from them, are provided without significant loss of mechanical and morphological properties. Furthermore, such fibers and membranes are flexible and durable, allowing them to be used in a variety of useful applications, e.g., in electrodes. Rapid deposition of the metal oxide coatings is facilitated by the large number of total functional groups on the surface of the fibers, e.g., from about $1.5 \times 10^{15}$ to about $1.5 \times 10^{30}$ total functional groups per gram of fiber, or from about $1.5 \times 10^{16}$ to about $1.5 \times 10^{25}$.

Electrostatic Layer-by-Layer Assembly

Layers of polyelectrolytes can be deposited onto an electrostatically charged, e.g., positively or negatively charged, nanostructure, e.g., a fiber or fibrous membrane, by alternately contacting the nanostructure with polycationic and polyanionic solutions. If the nanostructure is initially negatively charged, it is first contacted with a positively charged solution. Likewise, if the nanostructure is initially positively charged, it is first contacted with a negatively charged solution. As the nanostructure is immersed in a polyion solution, e.g., a polyelectrolyte solution, the polyions of the nanostructure and the solution complex together to form an insoluble polymeric salt on the surface of the nanostructure.

Figure 11:
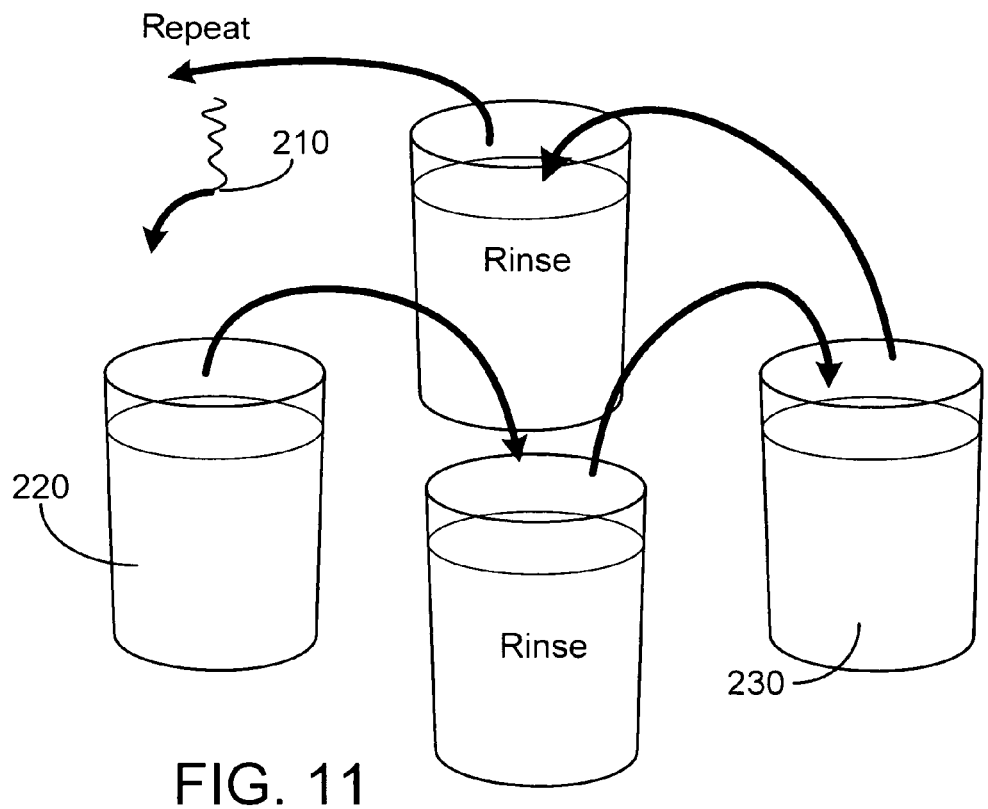
FIG. 11 is a schematic representation of a process for electrostatic layer-by-layer assembly on a functionalized fiber.
Figure 12:
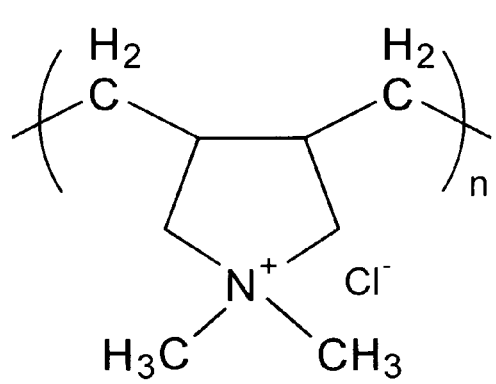
FIGS. 12 and 13 are structures for poly(diallyldimethylammonium chloride) and poly(sodium 4-styrene sulfonate), respectively.
Figure 13:
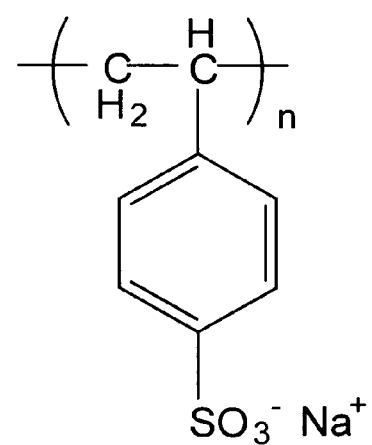

Referring to FIG. 11, in some embodiments, an anionic nanostructure, e.g., a fiber 210, is first dipped into a solution 220 containing a cationic polyelectrolyte, e.g., poly(diallyldimethylammonium chloride) shown in FIG. 12, producing a cationic outer-most surface. The nanostructure is then rinsed in, e.g., in de-ionized water, and then dipped into anionic polyelectrolyte 230, e.g., poly(sodium 4-styrene sulfonate) shown in FIG. 13, producing an anionic outer-most surface. After rinsing, the process can be repeated, a number of times, e.g., two, three, six, ten, fifteen or more times, e.g., fifty times. Electrostaticly assembled structures are often described in terms of numbers of bilayers, where a bilayer is a cationic layer paired with an anionic layer. When polyelectrolytes are used, it is believed that polymers bind substantially irreversibly. That is, once adsorbed, polyelectrolytes do not desorb and exchange with polymers in a solution.

Figure 14A:
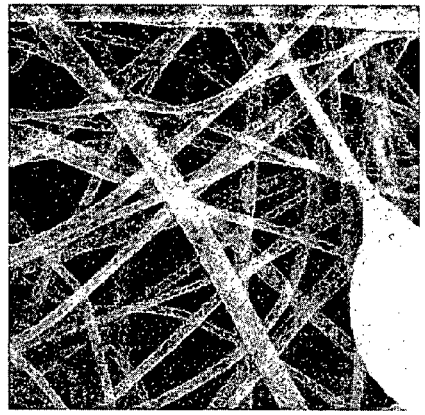
FIGS. 14A and 14B are scanning electron micrographs of a functionalized polyacrylonitrile fiber coated with one bilayer of poly(diallydimethylammonium chloride)/poly(sodium 4-styrene sulfonate) at 10,000× magnification and 20,000× magnification, respectively.
Figure 14B:
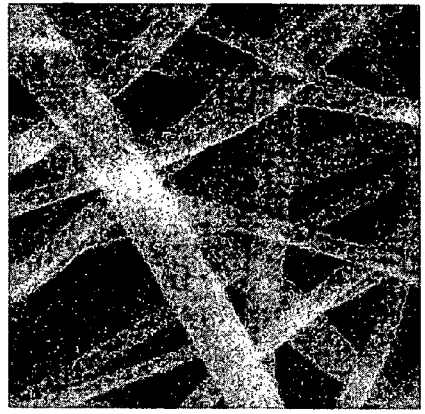
Figure 15A:
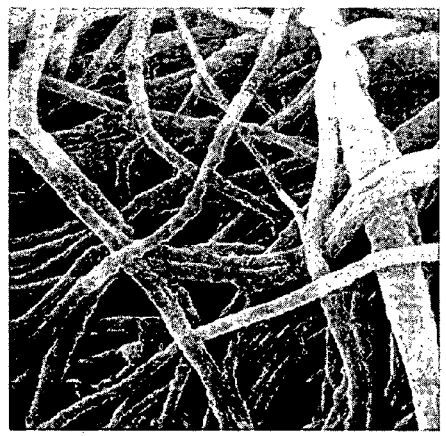
FIGS. 15A and 15B are scanning electron micrographs of a functionalized polyacrylonitrile fiber coated with ten bilayers of poly(diallydimethylammonium chloride)/poly(sodium 4-styrene sulfonate) at 10,000× magnification and 20,000× magnification, respectively.
Figure 15B:

FIGS. 14A and 14B are scanning electron micrographs of a functionalized polyacrylonitrile fiber coated with one bilayer of poly(diallydimethylammonium chloride)/poly(sodium 4-styrene sulfonate) at 10,000× magnification and 20,000× magnification, respectively. The membrane was initially negatively charged, so that after coating with poly(diallydimethylammonium chloride), followed by coating with poly(sodium 4-styrene sulfonate), the outer-most surface of functionalized fiber is once again negatively charged. FIGS. 15A and 15B are scanning electron micrographs of a functionalized polyacrylonitrile fiber coated with ten bilayers of poly(dially-dimethylammonium chloride)/poly(sodium 4-styrene sulfonate) at 10,000× magnification and 20,000× magnification, respectively. Collectively, FIGS. 14A-14B and 15A-15B show that bilayers are very thin. It is estimated that each bilayer is approximately 0.8 nm thick in the transverse direction. We have also found that film thickness is proportionate to the number of bilayers deposited, and the salt concentration, i.e., increased salt concentration causes thicker individual layers. We have also discovered that thickness can be varied based on pH, or ionic strength of the polyelectrolyte solution. Generally, higher ionization of the polyelectrolytes yields thinner deposition layers, e.g., 0.4 to about 0.5 nm thick.

Functionalized Nanoparticles and Coated Nanoparticles

Figure 16A:
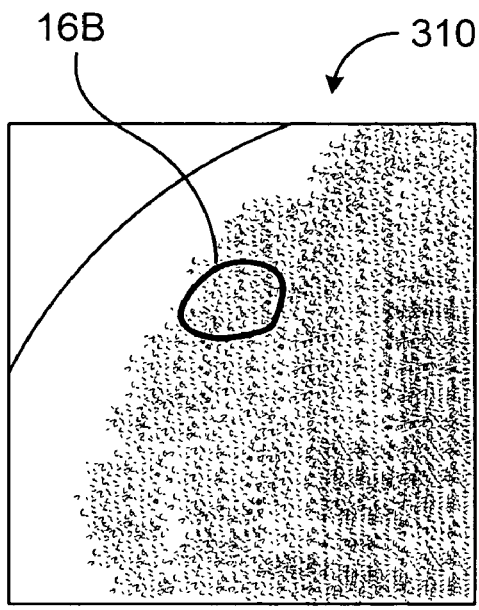
FIG. 16A is a schematic representation of a portion of a nanoparticle prior to functionalization.
Figure 16B:
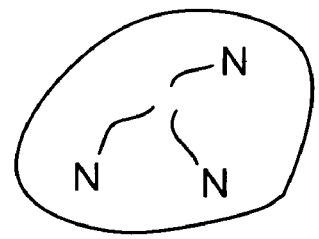
FIG. 16B is a highly enlarged schematic representation of the nanoparticle shown in FIG. 16A.
Figure 17A:
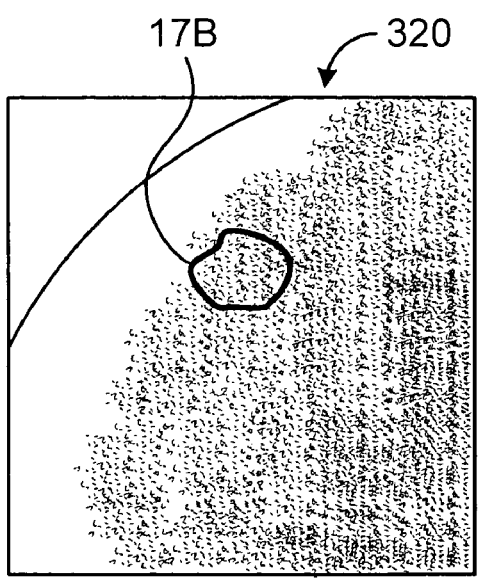
FIG. 17A is a schematic representation of the nanoparticle shown in FIG. 16 after functionalization.
Figure 17B:
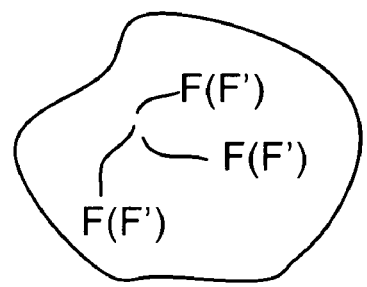
FIG. 17B is a highly enlarged schematic representation of the nanoparticle shown in FIG. 17A.

Referring to FIGS. 16A and 16B, a water-insoluble, un-functionalized nanoparticle 310 formed from polymeric material includes neutral functional groups (N) without ionizable hydrogen atoms on its surface. A largest dimension of these particles, e.g., a diameter when the particle is substantially spherical in shape, is less than 1000 nm, e.g., less than about 750 nm, 500 nm, 250 nm, 200 nm, 150 nm, 125 nm, 100 nm, 75 nm, 50 nm, or less than about 30 nm. Referring now to FIGS. 17A and 17B, a functionalized particle 320 is produced by reacting a percentage, e.g., from about 5 percent to about 100 percent, from about 10 percent to about 80 percent, from about 25 percent to about 70 percent, of the neutral functional groups (N) with a reagent under conditions and for a time sufficient to convert the neutral functional groups (N) to functional groups comprising an anion (F), e.g., a carboxylate group, and/or functional groups comprising an ionizable hydrogen atom (F'), e.g., a carboxylic acid group.

Un-functionalized nanoparticles 310 can be made by numerous conventional, well-known methods. These include solvent evaporation methods, with or without a surface active agent, e.g., polyvinyl alcohol (PVA), coacervation, or interfacial polymerization. Such methods can use organic solvents, e.g., methylene chloride, in combination with water and a surface active agent.

Conditions, e.g., temperatures and reagents, and times sufficient to convert the neutral functional groups of the nanoparticles are generally the same as those used for the conversion in the fibers discussed above.

The anions, functional groups that include an ionizable hydrogen atom, and the polymeric materials can be, e.g., generally any of those described above used in the fibers.

To facilitate the deposition of coatings, e.g., metal oxide coatings, a surface of the functionalized nanoparticle 320 includes from about $1.5 \times 10^{15}$ to about $1.5 \times 10^{30}$ total functional groups per gram of nanoparticle, e.g., from about $1.5 \times 10^{16}$ to about $1.5 \times 10^{25}$ or from about $1.5 \times 10^{17}$ to about $1.5 \times 10^{23}$. In some cases, all functional groups will be anionic, while in other situations, the surface of the functionalized fiber will have mixtures of the two functional groups.

Surprisingly, as was the case with the fibers discussed above, we have found that such functionalized nanoparticles keep many of the advantageous mechanical properties of the base particles from which they are derived, e.g., crush resistance.

In some implementations, a spacing between adjacent nanoparticles is such that adjacent nanoparticles become bonded together with the metal oxide, forming a fused, porous network.

Applications

In general, the fibrous materials or nanoparticles disclosed herein can be used in a catalyst system, e.g., a photocatalyst system, a sensor system, e.g., to detect ultra-trace levels of biological agents, or electrodes, e.g., a photovoltaic electrode, or an electrode in an electro-chromic device.

For example, titanium dioxide and/or doped titanium oxides can be coated on nanofibers or nanoparticles for use as a catalyst that photo-oxidizes organic molecules upon exposure to UV or visible light, e.g., sunlight. The large surface area of the substrate can increase the rate of conversion. Immersing the titanium oxide coated membrane in water, and then exposing the membrane to sunlight can oxidize organic contaminants in the water, e.g., hydrocarbons, halogenated hydrocarbons, e.g., polychlorinated biphenols, bacteria, viruses, and other organisms.

As another example, water can be converted into hydrogen and oxygen by photo-oxidation of water on titanium dioxide upon exposure to UV light.

Titanium dioxide coatings can be used as an oxygen sensor by measuring changes in resistance upon exposure to oxygen. Contiguous oxide coatings facilitate electron transport, and high surface areas increases the sensitivity by sampling a larger volume of analyte medium at any time.

Electrochromic or LED fibers can be made by layering an electrode on fibers having a conducting metal oxide coating. A conjugated organic material, e.g., that is polymeric or small molecule, or an inorganic semiconductor can then be layered on top of the electrode. A second transparent electrode, e.g., fluorine doped tin oxide or indium tin oxide, can then be layered as an outer-most layer to complete the circuit. Application of a voltage across the two electrodes cause the fibers to emit light or change color.

A photovoltaic cell can be made on the nanofibers by layering an electrode material, and then titanium dioxide covered in a chromophore.

EXAMPLES

The invention is further described in the following examples, which do not limit the scope of the invention described in the claims.

All chemicals and polymers were obtained from Aldrich Chemical Company, except hexafluorotitanate (IV) ammonium, $TiF_6(NH_4)_2$, and titanium dioxide nanoparticles, which was purchased from Strem Chemicals, and Degussa (P25), respectively. Materials were used as received.

Example 1

Electro-Spinning Polyacrylonitrile (PAN) Fibers

The electro-spinning apparatus used had a Gamma High Voltage Research, Inc. Model HV ES 30P/100 DC power source. A charged electrode wire was immersed in a viscous polymer solution of polyacrylonitrile (PAN) that was contained in a glass pipette. The polyacrylonitrile (PAN) had a number-average molecular weight of 86,200 D and was dissolved in N,N-dimethyl formamide (DMF) to form a spin dope solution that was 8.0% by weight of the polymer. A second ground wire from the power source was attached to a conducting target where the fibers were collected. A 15 to 20 kV spinning voltage was employed, and the distance from the tip of the spinneret to the target was about 15 cm. Electro-spun fibers were collected as a membrane of randomly oriented fibers on targets of aluminum foil, tin oxide-coated glass slides, or copper grid sample holders for use in a transmission electron microscope (TEM). Prior to surface functionalization, the membranes were heated at 50° C. for two hours and allowed to cool for at least six hours. The membranes included fibers that had a transverse dimension of from about 50 nm to about 250 nm. FIG. 3 is a schematic representation of an electro-spinning process.

Example 2

Fiber Surface Functionalization

Fibers of polyacrylonitrile (PAN) were formed by electro-spinning into membranes, as described above in Example 1. The electro-spun membranes were dried overnight, and then immersed in a 1 M solution of sodium hydroxide in water that was heated to 80° C. Samples were suspended in the NaOH solution for approximately 25 minutes, rinsed with de-ionized water, and dried in an oven at 60° C. Infrared spectroscopy showed that this procedure converted many of the nitrile groups on the fiber surface to negatively charged carboxylate groups (see FIGS. 7 and 8). FIGS. 4 and 5 are scanning electron micrographs of different regions of a fibrous membrane before functionalization and after functionalization, respectively

Example 3

Titanium Dioxide Coatings

Membranes prepared as in Example 2 were immersed in equal volumes of aqueous 0.12 M hexafluorotitanate (IV) ammonium, $TiF_6(NH_4)_2$, and 0.2 M boric acid ($H_3BO_3$) as fluorine scavenger. A continuous titanium dioxide coating forms on the surface of the fibers after approximately 8 to 15 hours. FIG. 10 is a scanning electron micrograph of a functionalized fiber coated with titanium dioxide.

Example 4

Titanium Dioxide Coatings Using Nanoparticles of Titanium Dioxide

Commercially available nanoparticles were ground with a mortar and pestle together with 5 M HCl (1 g $TiO_2$ to 20 ml acid). This solution was then diluted 40 times with de-ionized water. The functionalized membranes from Example 2 were immersed in the diluted $TiO_2$ suspension for several seconds and then rinsed with de-ionized water.

Example 5

Tin Dioxide Coating

Membranes prepared as in Example 2 were immersed in equal volumes of aqueous 0.12 M $SnF_6(NH_4)_2$, 0.2 M boric acid as fluorine scavenger. A continuous tin dioxide coating formed on the surface of the fibers after 8 to 15 hours. The probability of gaps in the coating decreases with longer times.

Example 6

Zinc Oxide Coating

Membranes prepared as in Example 2 were immersed in equal volumes of aqueous 0.12 M $ZnF_2$, and 0.2 M boric acid as fluorine scavenger. A continuous zinc oxide coating formed on the surface of the fibers after approximately 8 to 15 hours.

Example 7

Mixed Metal Oxide Coatings (Tin and Titanium Oxide)

Membranes prepared as in Example 2 were immersed in equal volumes of aqueous 0.12 M hexafluorotitanate (IV) ammonium, 0.2 M boric acid, and 0.12 M $SnF_6(NH_4)_2$. A continuous mixed metal oxide coating containing both tin and titanium oxides formed on the surface of the fibers after approximately 8 to 15 hours. For comparison, a continuous metal oxide coating on PAN fibers that were not immersed in sodium hydroxide took at least 36 hours to form.

Example 8

Multi-Layer Coatings

A fibrous membrane having multiple layers of polyelectrolytes built up on surfaces of functionalized fibers was obtained by alternately dipping the membrane of Example 2 in solutions of poly(diallyldimethylammonium chloride), PDAC, and sulfonated polystyrene (SPS), sodium salt. Both polyelectrolyte solutions where 0.005 M, base on repeat unit. Four complete bilayers of PDAC and SPS were applied. Each layer was allowed to dry in an 80° C. oven for 5-10 minutes before applying the next layer. FIG. 11 is a schematic representation of a process for electrostatic layer-by-layer assembly on a functionalized fiber, and FIGS. 14A-14B and FIGS. 15A-15B are scanning electron micrographs of membranes having multi-layers.

Example 9

Titanium Dioxide Coatings on Polyacrylonitrile Nanoparticles

Polyacrylonitrile nanoparticles are functionalized by immersing in a 1 M solution of sodium hydroxide in water that was heated to 80° C. Samples are suspended in the NaOH solution for approximately 25 minutes, rinsed with de-ionized water, collected using a centrifuge, and dried in an oven at 60° C.

Nanoparticles are immersed in equal volumes of aqueous 0.12 M hexafluorotitanate (IV) ammonium, $TiF_6(NH_4)_2$, and 0.2 M boric acid ($H_3BO_3$) as fluorine scavenger. A continuous titanium dioxide coating forms on the surface of the nanoparticles after approximately 8 to 15 hours.

Example 10

Titanium Dioxide Films on Polyacrylonitrile Nanoparticles

Functionalized polyacrylonitrile nanoparticles are made according to Example 9, mixed with water and Triton X (a surfactant), and are then spread onto a glass microscope slide. The particles on the slide are dried in an oven at 60° C. The nanoparticles on the slide are immersed in equal volumes of aqueous 0.12 M hexafluorotitanate (IV) ammonium, $TiF_6(NH_4)_2$, and 0.2 M boric acid ($H_3BO_3$) as fluorine scavenger. A continuous titanium dioxide coating forms on the surface of the nanoparticles, connecting them in a fused, porous network after approximately 8 to 15 hours.

Other Embodiments

A number of embodiments of the invention have been described. Nevertheless, it will be understood that various modifications may be made without departing from the spirit and scope of the invention.

For example, charged metal oxide particles, e.g., that are 1-10 nm in diameter, can be electrostatically assembled onto a fiber surface, which can then be used as a substrate for layer-by-layer deposition. The particles act as nucleation sites, decreasing the time to form a continuous coating.

Still other embodiments are within the claims.

What is claimed is:

1. A method of making a functionalized nanostructure, the method comprising:
    providing a nanostructure comprising a substantially water-insoluble first polymer that comprises neutral functional groups without ionizable hydrogen atoms on its surface, the nanostructure also having a transverse dimension less than 1000 nm;
    reacting at least some of the neutral functional groups with a reagent under conditions and for a time sufficient so as to convert at least some of the neutral functional groups to converted functional groups, wherein the converted functional groups comprise one or more anions, ionizable hydrogen atoms, or a mixture of anions and ionizable hydrogen atoms, thereby generating a functionalized nanostructure; and
    contacting the functionalized nanostructure with a metal hydroxide or a second polymer under conditions and for a time sufficient to deposit a metal oxide coating or to deposit a coating of the second polymer onto the functionalized nanostructure.

2. The method of claim 1, wherein the nanostructure is in the form of a fiber.

3. The method of claim 2, wherein a surface of the functionalized fiber includes from about $1.5 \times 10^{15}$ to about $1.5 \times 10^{30}$ total converted groups per gram of fiber.

4. The method of claim 2, further comprising preparing the fiber by electro-spinning.

5. The method of claim 1, wherein the nanostructure is in the form of a particle.

6. The method of claim 1, wherein the nanostructure is in the form of a fiber in a fibrous membrane.

7. The method of claim 1, wherein the reagent is in a liquid phase.

8. The method of claim 1, wherein conditions include heating in a liquid phase at a temperature of less than 100° C. for less than 1 hour.

9. The method of claim 1, wherein the neutral functional groups without ionizable hydrogen atoms are selected from the group consisting of nitrile groups, anhydride groups, acetate groups, ester groups, peroxide groups, azo groups, vinyl groups, and mixtures thereof.

10. The method of claim 1, wherein the anions are selected from the group consisting of a carboxylate, a phosphate, the conjugate base of a sulfonic acid, the conjugate base of a sulfhydryl group, the conjugate base of a hydroxyl group, and mixtures thereof.

11. The method of claim 1, wherein the functional groups comprising an ionizable hydrogen atom are selected from the group consisting of an acyclic amide group, a cyclic amide group, an amino group, a hydroxyl group, a sulfhydryl group, a carboxylic acid group, and mixtures thereof.

12. The method of claim 1, wherein the first polymer is selected from the group consisting of polyacrylonitrile, polymethacrylonitrile, poly(acrylonitrile-co-methacrylonitrile), poly(acrylonitrile-co-butadiene), poly(methacrylonitrile-co-butadiene), poly(acrylonitrile-co-butadiene-co-acrylic acid), poly(acrylonitile-co-butadiene-co-styrene), poly(acrylonitrile-co-methyl acrylate), poly(acrylonitrile-co-vinylidene chloride-co-methyl methacrylate), polyvinylazobenzene, poly(vinyl acetate), poly(methyl acrylate), poly(methyl methacrylate), poly(allylamine), and mixtures thereof.

13. The method of claim 1, wherein the reagent comprises a Bronsted base or a Bronsted acid.

14. The method of claim 13, wherein the Bronsted base comprises an aqueous solution of sodium hydroxide.

15. The method of claim 1, wherein the transverse dimension is less than about 500 nm.

16. The method of claim 1, wherein the functionalized nanostructure is contacted with a metal hydroxide to deposit a metal oxide coating onto the functionalized nanostructure.

17. The method of claim 16, wherein the metal oxide coating comprises titanium oxide, zinc oxide, tin oxide, silicon oxide, iron oxide, lead oxide, aluminum oxide, hafnium oxide, or a mixed metal oxide.

18. The method of claim 16, wherein the metal oxide coating comprises titanium dioxide, tin oxide, or both.

19. The method of claim 1, wherein the functionalized nanostructure is contacted with the second polymer to deposit a coating of the second polymer onto the functionalized nanostructure.

20. The method of claim 19, wherein the second polymer comprises poly(diallyldimethylammonium chloride) (PDAC), sulfonated polystyrene (SPS), and poly(sodium 4-styrene sulfonate).

21. A method of making a functionalized membrane, the method comprising:
    providing a membrane comprising fibers comprising a water-insoluble first polymer that comprises neutral functional groups without ionizable hydrogen atoms on its surface, the fibers having a diameter of less than 1000 nm;
    reacting at least some of the neutral functional groups with a reagent under conditions and for a time sufficient so as to convert at least some of the neutral functional groups to converted functional groups, wherein the converted functional groups comprise one or more anions, ionizable hydrogen atoms, or a mixture of anions and ionizable hydrogen atoms, thereby generating a functionalized membrane; and contacting the functionalized membrane with a metal hydroxide or a second polymer under conditions and for a time sufficient to deposit a metal oxide coating or to deposit a coating of the second polymer onto fibers of the functionalized membrane.

22. The method of claim 21, wherein the functionalized membrane is contacted with a metal hydroxide to deposit a metal oxide coating onto fibers of the functionalized membrane.

23. The method of claim 22, wherein the metal oxide coating comprises titanium oxide, zinc oxide, tin oxide, silicon oxide, iron oxide, lead oxide, aluminum oxide, hafnium oxide, or a mixed metal oxide.

24. The method of claim 22, wherein the metal oxide coating comprises titanium dioxide, tin oxide, or both.

25. The method of claim 21, wherein the functionalized membrane is contacted with the second polymer to deposit a coating of the second polymer onto fibers of the functionalized membrane.

26. The method of claim 25, wherein the second polymer comprises poly(diallyldimethylammonium chloride) (PDAC), sulfonated polystyrene (SPS), and poly(sodium 4-styrene sulfonate).

27. The method of claim 21, wherein the neutral functional groups without ionizable hydrogen atoms are selected from the group consisting of nitrile groups, anhydride groups, acetate groups, ester groups, peroxide groups, azo groups, vinyl groups, and mixtures thereof.

28. The method of claim 21, wherein the anions are selected from the group consisting of a carboxylate, a phosphate, the conjugate base of a sulfonic acid, the conjugate base of a sulfhydryl group, the conjugate base of a hydroxyl group, and mixtures thereof.

29. The method of claim 21, wherein the functional groups comprising an ionizable hydrogen atom are selected from the group consisting of an acyclic amide group, a cyclic amide group, an amino group, a hydroxyl group, a sulfhydryl group, a carboxylic acid group, and mixtures thereof.

30. The method of claim 21, wherein the first polymer is selected from the group consisting of polyacrylonitrile, polymethacrylonitrile, poly(acrylonitrile-co-methacrylonitrile), poly(acrylonitrile-co-butadiene), poly(methacrylonitrile-co-butadiene), poly(acrylonitrile-co-butadiene-co-acrylic acid), poly(acrylonitile-co-butadiene-co-styrene), poly(acrylonitrile-co-methyl acrylate), poly(acrylonitrile-co-vinylidene chloride-co-methyl methacrylate), polyvinylazobenzene, poly(vinyl acetate), poly(methyl acrylate), poly(methyl methacrylate), poly(allylamine), and mixtures thereof.

* * * * *

UNITED STATES PATENT AND TRADEMARK OFFICE
CERTIFICATE OF CORRECTION

PATENT NO. : 7,718,112 B2
APPLICATION NO. : 11/209898
DATED : May 18, 2010
INVENTOR(S) : Christopher Drew Page 1 of 1

It is certified that error appears in the above-identified patent and that said Letters Patent is hereby corrected as shown below:

Column 16, line 27, in claim 12, delete "acrylonitile" and insert --acrylonitrile--.

Column 18, line 21, in claim 30, delete "acrylonitile" and insert --acrylonitrile--.

Signed and Sealed this

Seventeenth Day of August, 2010

David J. Kappos
*Director of the United States Patent and Trademark Office*